(12) United States Patent
Shiozaki et al.

(10) Patent No.: US 6,437,908 B2
(45) Date of Patent: Aug. 20, 2002

(54) OPTICAL AMPLIFYING DEVICE

(75) Inventors: Toru Shiozaki, Kobe; Masaru Fuse, Toyonaka, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/773,613

(22) Filed: Feb. 2, 2001

(30) Foreign Application Priority Data

Feb. 3, 2000 (JP) ........................................ 2000-026806
Apr. 20, 2000 (JP) ........................................ 2000-118987

(51) Int. Cl.$^7$ .............................................. H04B 10/12
(52) U.S. Cl. .................... 359/341.43; 359/177; 359/337
(58) Field of Search ...................... 359/341.43, 341.4, 359/341.42, 333, 337.11, 177, 336

(56) References Cited

U.S. PATENT DOCUMENTS

| | | | | |
|---|---|---|---|---|
| 5,396,360 A | * | 3/1995 | Majima | 359/115 |
| 5,455,710 A | | 10/1995 | Takeda | 359/341 |
| 5,563,731 A | * | 10/1996 | Asahi | 359/177 |
| 5,570,227 A | * | 10/1996 | Nabeyama et al. | 359/337 |
| 5,633,749 A | * | 5/1997 | Shibuya | 359/177 |
| 5,701,195 A | * | 12/1997 | Chikama | 359/161 |
| 5,864,422 A | * | 1/1999 | Miyazaki et al. | 359/134 |
| 5,892,616 A | * | 4/1999 | Takahashi | 359/177 |
| 6,064,514 A | * | 5/2000 | Aoki et al. | 359/160 |
| 6,078,422 A | * | 6/2000 | Kosaka et al. | 359/161 |
| 6,229,643 B1 | * | 5/2001 | Nakamura | 359/177 |
| 6,233,385 B1 | * | 5/2001 | Taneda et al. | 359/341.43 |
| 6,373,610 B1 | * | 4/2002 | Takehana et al. | 359/161 |

FOREIGN PATENT DOCUMENTS

| | | | |
|---|---|---|---|
| JP | 9-130328 | 5/1997 | |
| JP | 10-004231 | 1/1998 | |
| JP | 10-51395 | * 2/1998 | ........... H04B/10/28 |
| JP | 11-135862 | 5/1999 | |
| JP | 11-205227 | 7/1999 | |

OTHER PUBLICATIONS

Karasek, M. et al. "Effectiveness of gain control in EDFAs against traffic with different levels of bursty behavior." IEE Proc. Optoelectronics, 147:5, Oct. 2000, pp. 355–362.*

* cited by examiner

Primary Examiner—Thomas H. Tarcza
Assistant Examiner—Andrew R. Sommer
(74) Attorney, Agent, or Firm—Wenderoth, Lind & Ponack, L.L.P.

(57) ABSTRACT

An optical brancher 110 branches an input optical signal into two. An optical detector 120 converts one optical signal branched by t e optical brancher 110 into an electrical signal. A first controller 122 generates a control electrical signal having a waveform obtained by inverting the envelope of the electrical signal. Based on the control electrical signal, an optical signal generator 124 produces a dummy optical signal having a waveform $\lambda d$ and an amplitude $\alpha/2$. The other signal branched by the optical brancher 110 is delayed by a delay unit 112 for a predetermined time, and then multiplexed by an optical multiplexer 114 with the dummy optical signal from the optical signal generator 124. An optical amplifier 116 amplifies a multiplexed optical signal. An optical filter 118 separates an optical signal of a wavelength $\lambda 1$ from the amplified optical signal. Thus optical signal amplification can be carried out without optical surges.

20 Claims, 20 Drawing Sheets

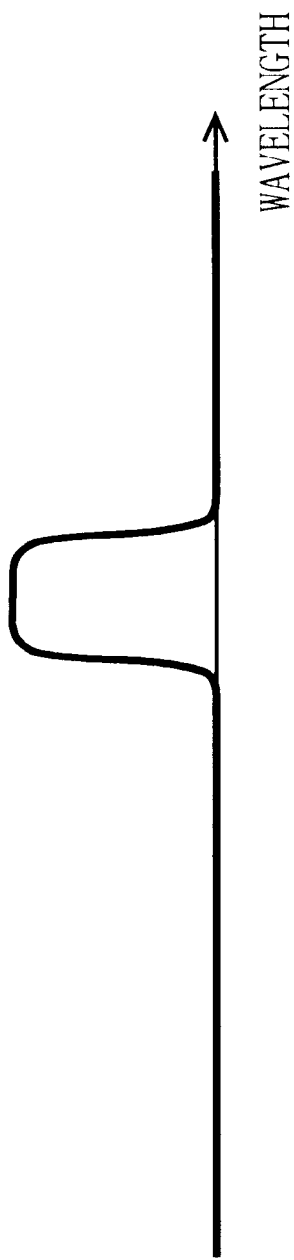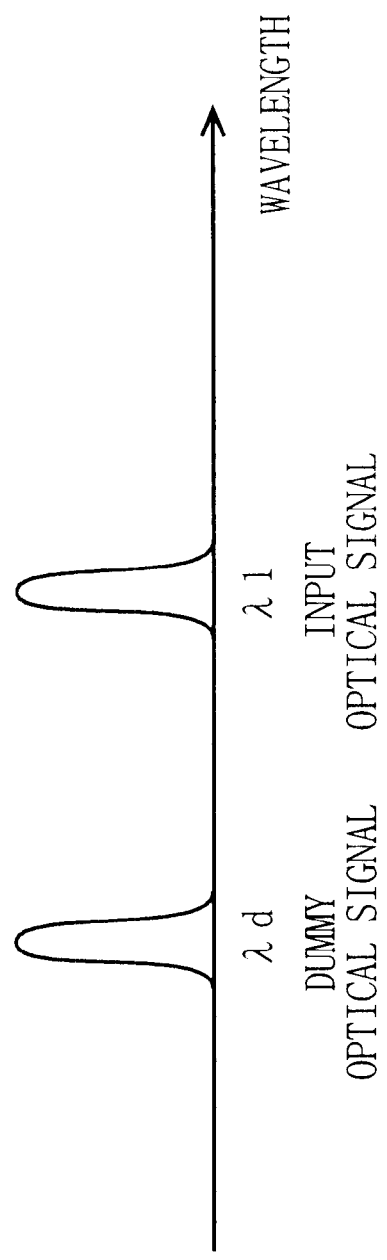

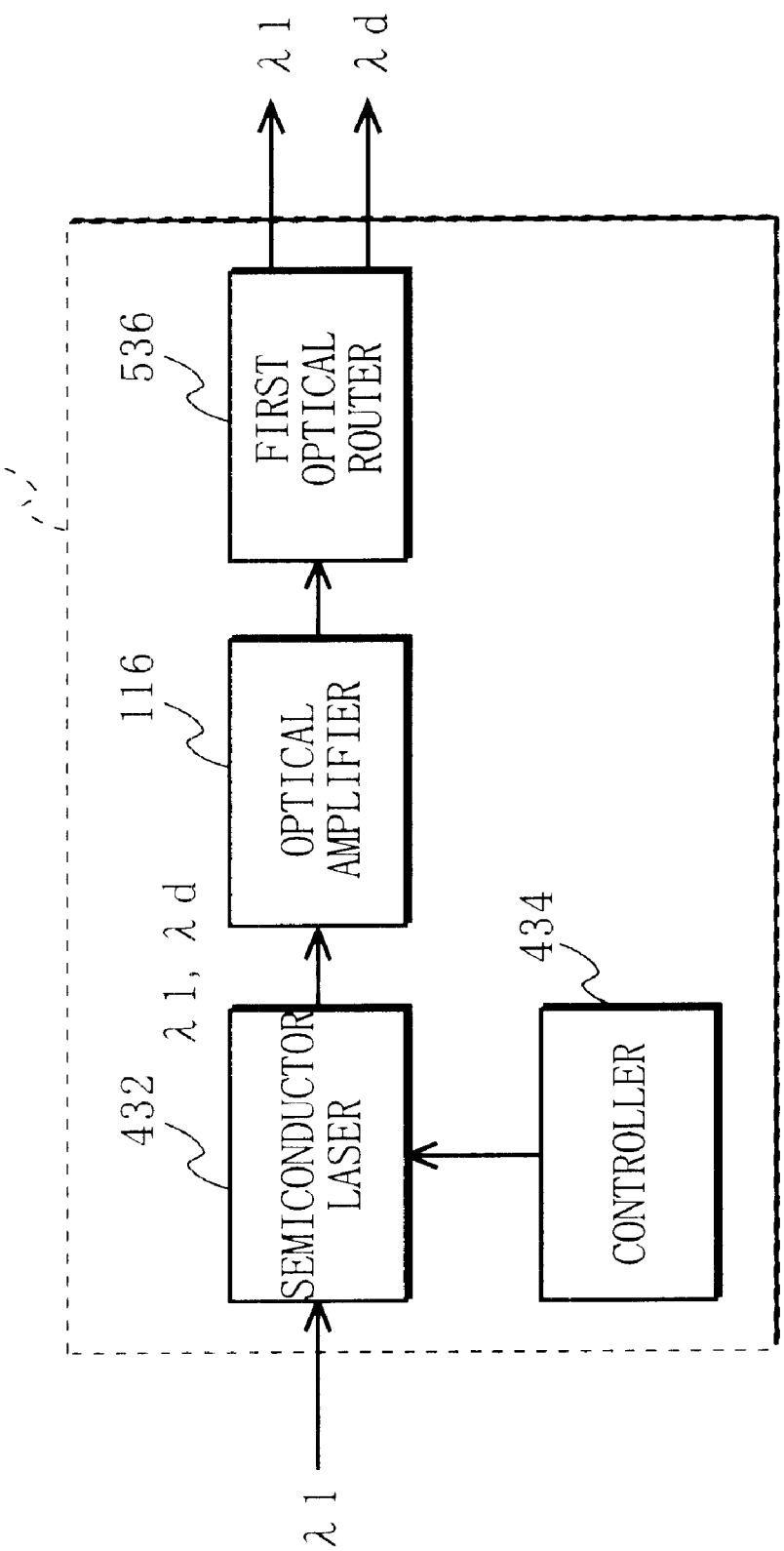

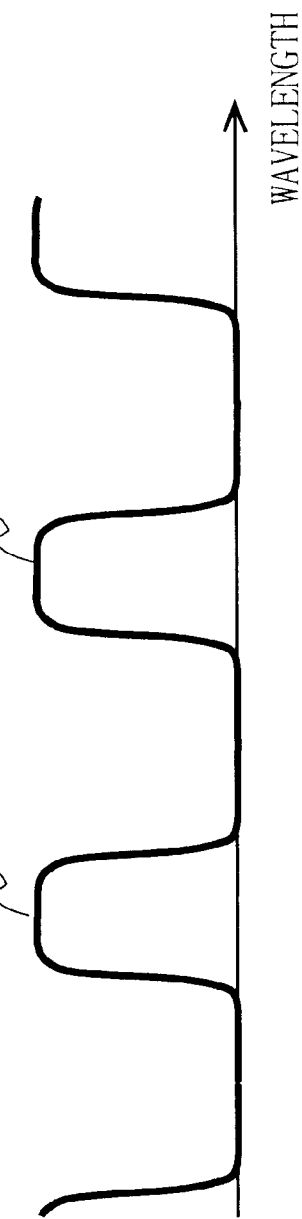
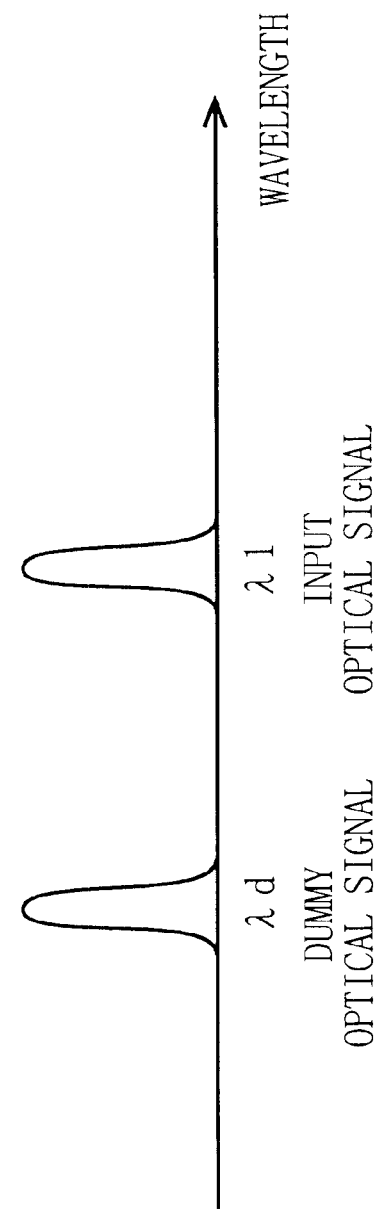
FIG. 13a
FIG. 13b

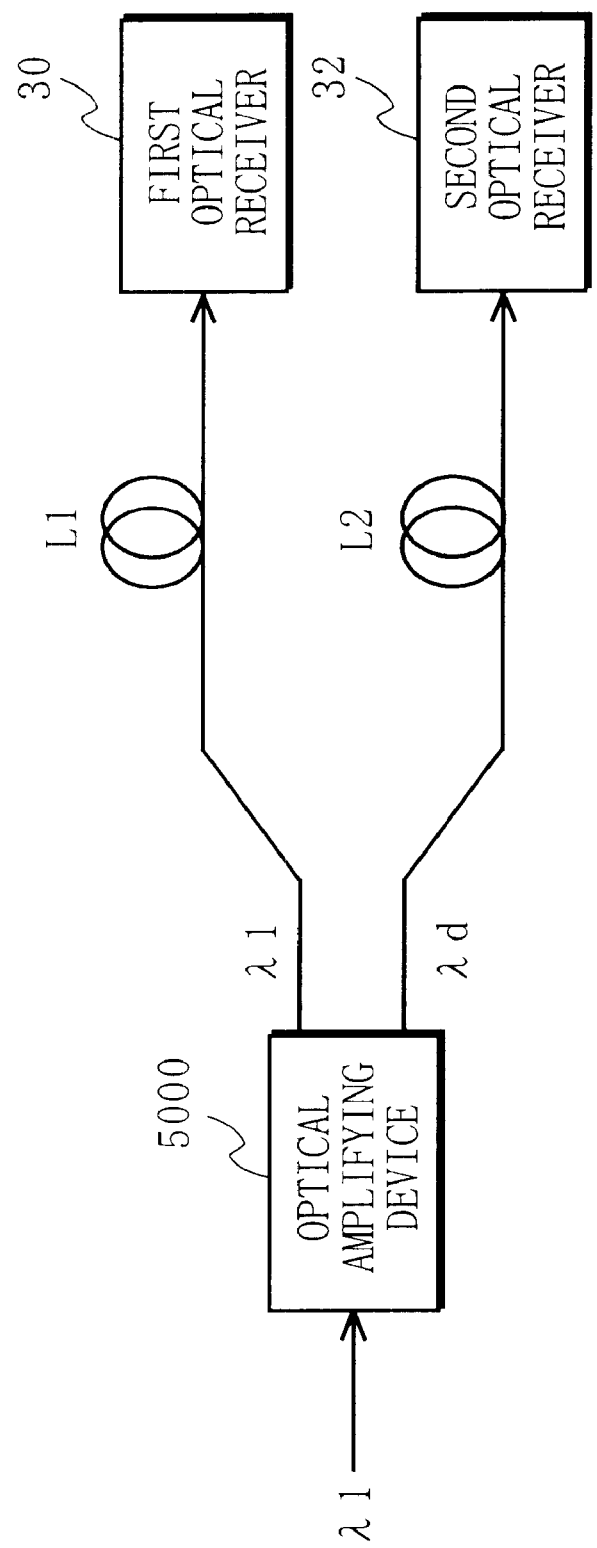

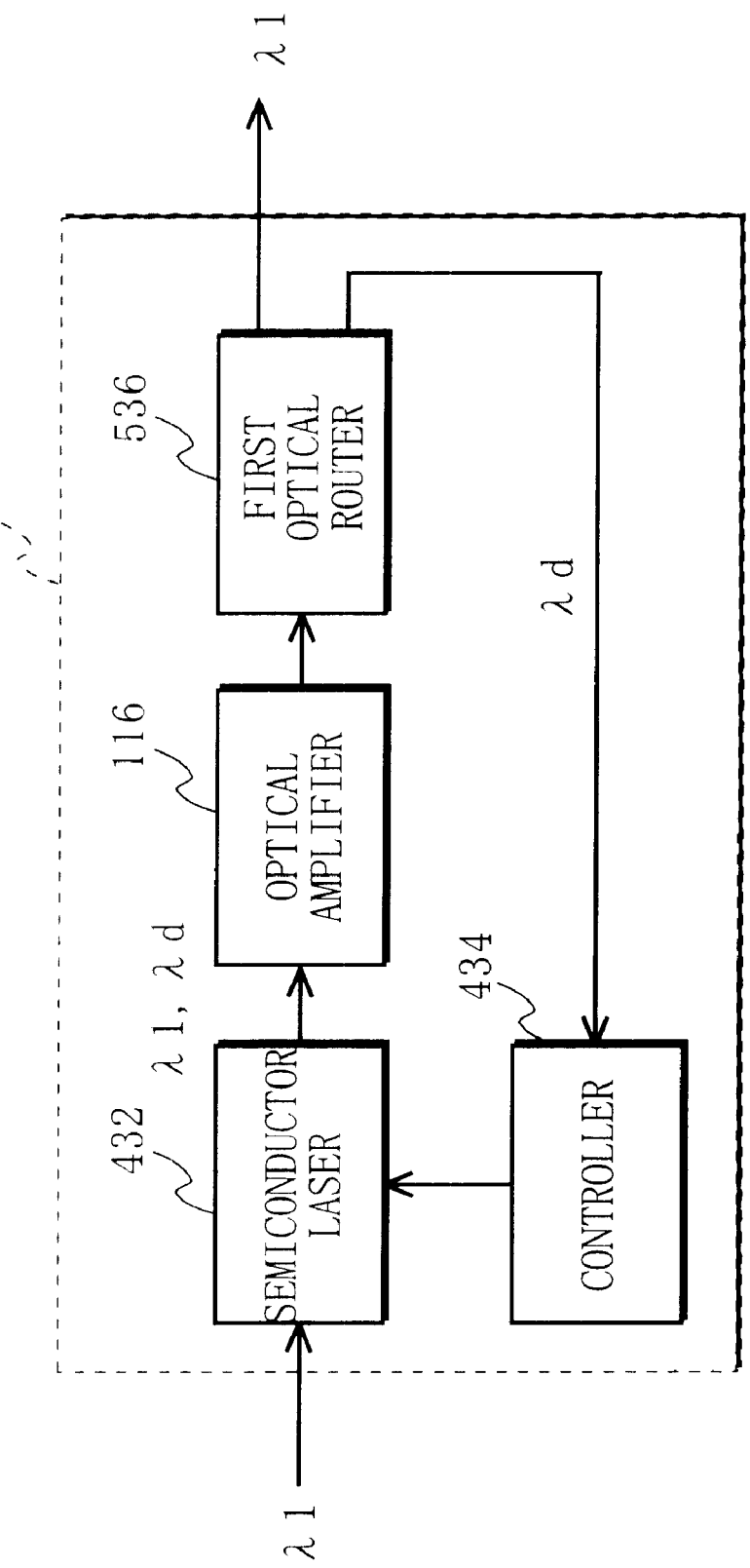

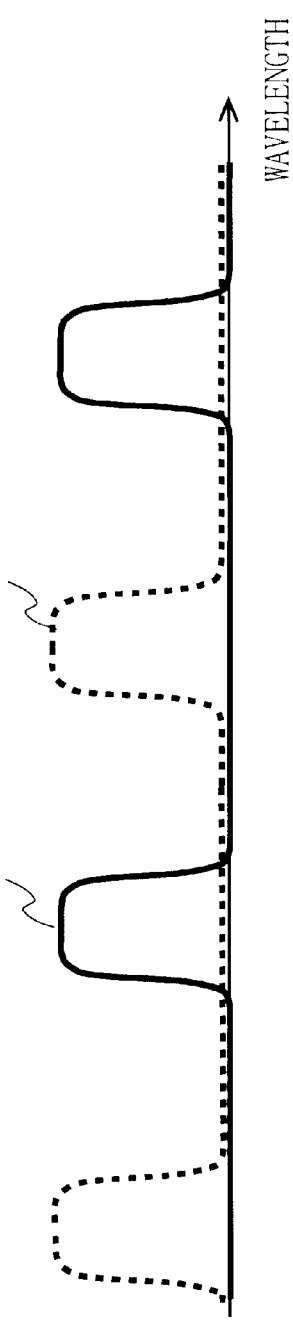
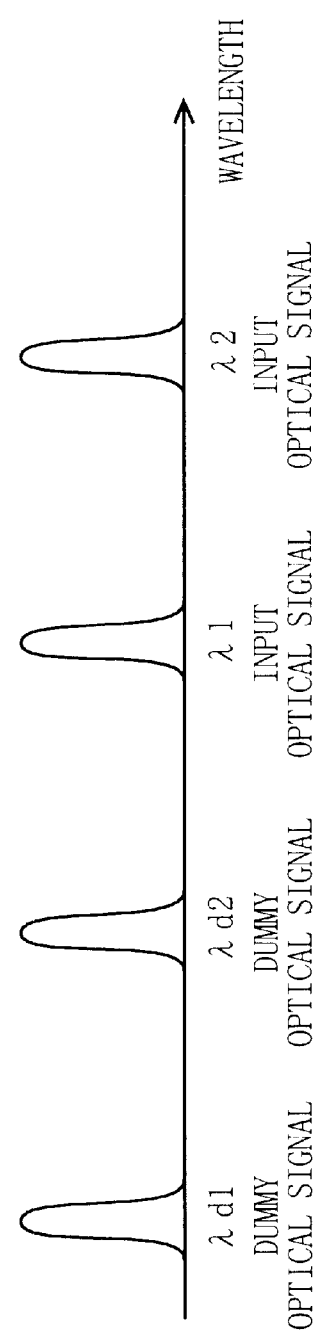
FIG. 17a
FIG. 17b

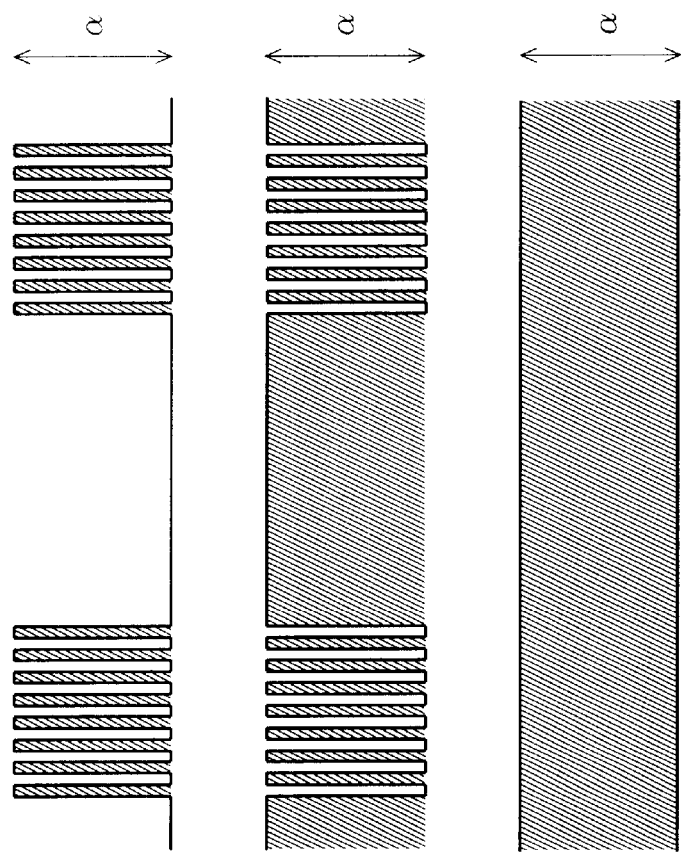

OPTICAL AMPLIFYING DEVICE

BACKGROUND OF THE INVENTION

1. Field of the Invention

The present invention relates to optical amplifying devices for amplifying an input optical signal and, more specifically, to an optical amplifying device suitable for use in amplifying a burst optical signal.

2. Description of the Background Art

As well known, when intermittently-inputted optical signals (hereinafter referred to as burst optical signals) are amplified through a general optical fiber amplifier, for example, waveform degradation, called optical surges, occurs in the optical signals. Optical surges are now briefly described with reference to the accompanying drawings.

Optical surges are caused by transient response of optical amplifiers. How much the input optical signal is degraded in a waveform depends on the characteristics of the optical amplifier, such as a relaxation time constant. Waveform degradation also depends on the input optical signal itself. As the input light varies in power, the waveform becomes degraded.

FIG. 18a shows the waveform of an optical signal when the amount of data traffic is small and data is intermittently transmitted, such as a case where data packets are spaced long. If such burst optical signal as shown in FIG. 18a is provided to an optical amplifier, temporary periods during which no data is provided at all are observed, which are hereinafter referred to as a no-data period. If an optical signal is provided after a long no-data period, input light optical power varies. Therefore, as shown in FIG. 18b, the optical signal after amplification is instantaneously increased in level (optical surges), thereby causing degradation in the waveform.

Such waveform degradation in a transmission system makes it difficult for a receiving side to always optimally identify data Thus, optical surges have to be suppressed. From this viewpoint, one optical amplifying device capable of carrying out optical amplification while suppressing optical surges is disclosed in Japanese Patent Laid-Open Publication No. 11-135862 (1999-135862). This conventional optical amplifying device (hereinafter referred to as conventional device) is described below with reference to the drawings.

As shown in FIG. 19, a conventional device 9000 is provided with an input optical signal of a wavelength λ1 as shown in FIG. 20a. The provided optical signal is branched into two by an optical brancher 910. One branched optical signal goes through an optical receiver 920, an inverting amplifier 940, and a light source 924, thereby being converted into an optical signal of a wavelength λd with its logic level inverted, as shown in FIG. 20b. Then, the converted optical signal is multiplexed with the other optical signal branched by the optical brancher 910. The optical signal after such multiplexing is constant in optical power, as shown in FIG. 20c.

The optical signal after multiplexing is amplified by an optical fiber amplifier 916. At this time, optical surges do not occur since the input light is constant in optical power. The amplified optical signal is provided to an optical filter 918, wherein the optical signal of the wavelength λ1 is passed through.

As such, according to the conventional device 9000, the input optical signal is superposed with a dummy optical signal having a different wavelength. Thus, the input light provided to the amplifier 916 can become temporarily constant in optical power. In this way, optical amplification can be carried while optical surges are suppressed.

As stated above, in the conventional device, the input optical signal is superposed with the dummy optical signal, and then provided to the amplifier. Therefore, the optical signal provided to the amplifier becomes larger in optical power on average than the input optical signal. In general, amplification gain of the amplifier varies according to the average optical power of the optical signal provided to the amplifier. The larger the optical power of the input light is, the less the amplification gain is. Therefore, in the conventional device, the amplification gain of the amplifier is disadvantageously reduced.

Moreover, the conventional device has to accurately detect data provided at a higher bit rate such as 10 gigabits/sec and for logic level inversion. Accordingly, the electrical load on the conventional device is increased. This increase lea s to a degradation in device's performance and an increase in cost.

Also, a large number of components are required for the conventional device. Thus, the conventional device is complex in structure.

SUMMARY OF HE INVENTION

Therefore, one object of the present invention is to provide an optical amplifying device capable of carrying out optical amplification while suppressing optical surges and also preventing reduction in amplification gain of an amplifier. A further object of the present invention is to provide an optical amplifying device capable of carrying out optical amplification while suppressing optical surges without requiring a large-load electrical process. A still further object of the present invention i to provide an optical amplifying device capable of carrying out optical amplification while suppressing optical surges in simple structure.

The present invention has the following features to achieve the objects above.

A first aspect of the present invention is directed to an optical amplifying device for amplifying an input optical signal, the device comprising:

a control electrical signal generator for generating a control electrical signal having a waveform obtained by inverting an envelope of the input optical signal;

a light-emitter for outputting, based on the control electrical signal, a dummy optical signal having a wavelength that is different from a wavelength of the input optical signal;

a multiplexer for multiplexing the input optical signal and the dummy optical signal;

an amplifier for amplifying a multiplexed optical signal; and a separator for separating at least the input optical signal from an optical signal after amplification by the amplifier.

As described above, in the first aspect, the input optical signal is multiplexed with the dummy optical signal having a waveform obtained by inverting the envelope of the input optical signal. Thus, optical amplification can be carried out without waveform degradation.

A second aspect of the present invention is directed to an optical amplifying device for amplifying an input optical signal, the device comprising:

a light-emitter for transmitting the input optical signal, and emitting, based on the optical signal transmitted by the light-emitter, a dummy optical signal having a waveform obtained by inverting a waveform of the input optical signal and having a wavelength that is different from a wavelength of the input optical signal;

a controller for controlling the wavelength of the dummy optical signal emitted from the light-emitter;

an amplifier for amplifying the optical signal and the dummy optical signal from the light-emitter; and a separator for separating the input optical signal from an optical signal after amplification.

As described above, in the second aspect, by being transmitted through the light-emitter, the optical signal is multiplexed with the dummy optical signal having the waveform obtained by inverting the waveform of the input optical signal. Thus, optical amplification can be carried out in a more simplified structure without optical surges.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3a and 3b are diagrams in assistance of explaining the operation of an optical filter 118;

FIG. 11 is a block diagram showing the structure of an optical amplifying device 5000 according to a fifth embodiment of the present invention;

FIGS. 13a and 13b are diagrams in assistance of explaining the operation of a first optical router 536;

FIG. 14 is a block diagram showing the structure of an optical transmission system using the optical amplifying device 5000;

FIG. 15 is a block diagram showing the structure of an optical amplifying device 6000 according to a sixth embodiment of the present invention;

FIGS. 17a and 17b are diagrams in assistance of explaining the operation of a second optical router 736;

FIGS. 20a to 20c are diagrams showing waveforms of optical signals in the conventional optical amplifying device 9000.

DESCRIPTION OF THE PREFERRED EMBODIMENTS

The embodiments of the present invention are described below with reference to the drawings.

First Embodiment

Figure 1:
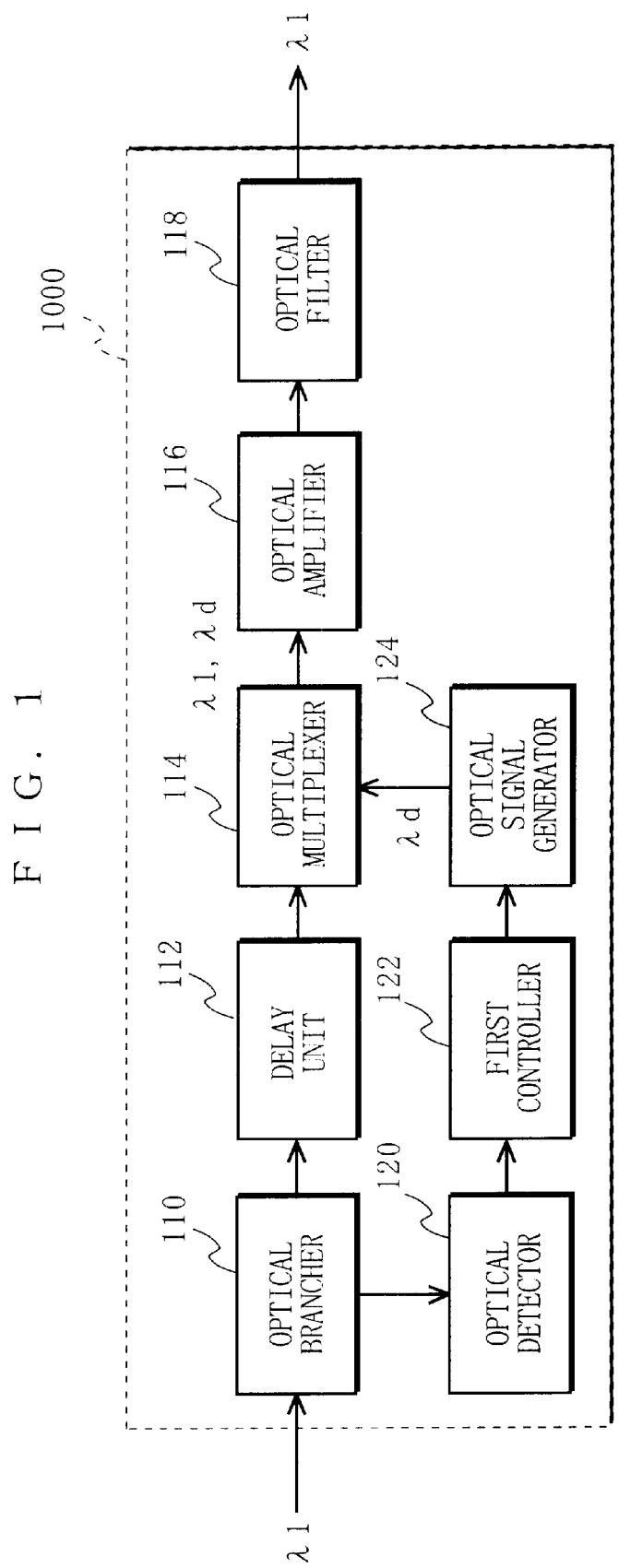
FIG. 1 is a block diagram showing the structure of an optical amplifying device 1000 according to a first embodiment of the prevent invention.

FIG. 1 is a block diagram showing the structure of an optical amplifying device according to a first embodiment of the present invention. An optical amplifying device 1000 includes an optical brancher 110, a delay unit 112, an optical multiplexer 114, an optical amplifier 116, an optical filter 118, an optical detector 120, a first controller 122, and an optical signal generator 124. With reference to FIGS. 1, 2a to 2d, 3a, and 3b, the operation n of the optical amplifying device according to the present embodiment is now described.

Figure 2A:
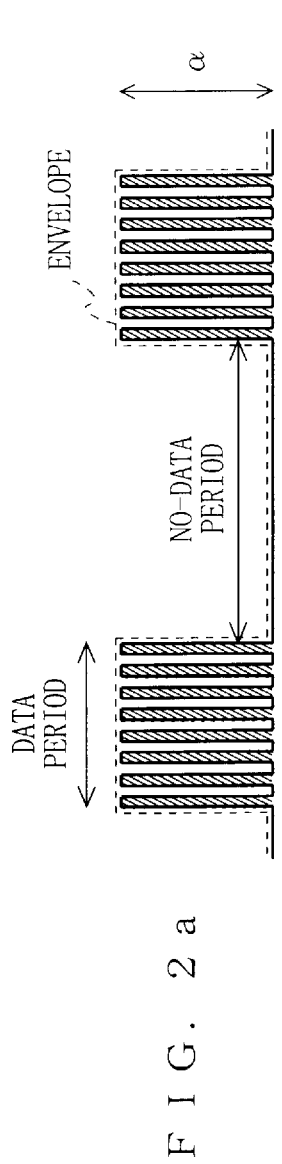
FIGS. 2a to 2d are diagrams showing waveforms of optical signals in the optical amplifying device 1000.

The optical amplifying device 1000 is provided with an input optical signal having a waveform $\lambda 1$ and an amplitude $\alpha$. This optical signal carries burst-like binary digital data. FIG. 2a shows the waveform of this optical signal. In FIG. 2a, a period during which binary digital data is carried on the optical signal is referred to as a data period, while a period during which no binary digital data is carried thereon is referred to as a no-data period. A dotted line indicates an envelope of the optical signal.

Figure 2B:
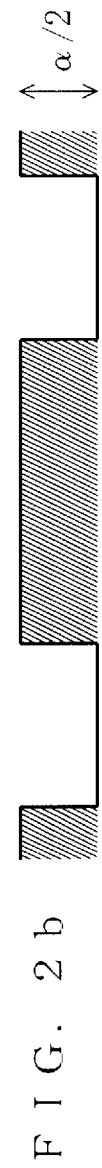

The optical brancher 110 branches the received optical signal into two. The optical detector 120 converts one optical signal outputted from the optical brancher 110 into an electrical signal. The first controller 122 generates a control electrical signal having a waveform obtained by inverting the envelope of the electrical signal. Based on this control electrical signal, the optical signal generator 124 produces a dummy optical signal having a waveform $\lambda d$ and an amplitude $\alpha/2$. FIG. 2b shows the waveform of the dummy optical signal.

Figure 2C:
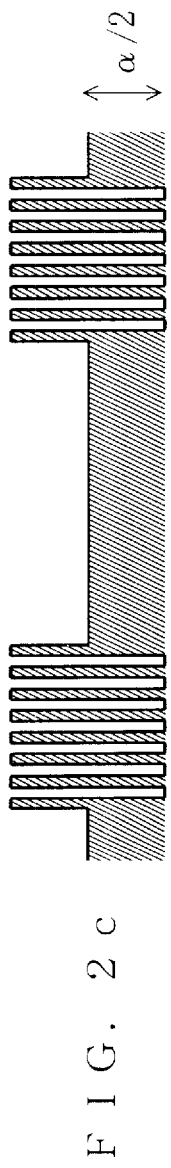

On the other hand, the other optical signal outputted from the optical brancher 110 is delayed by the delay unit 112 for a predetermined time, and then forwarded to the optical multiplexer 14. Here, the predetermined time is a time required for the one optical signal outputted from the optical brancher 110 to go through the optical detector 120, the first controller 122, and then the optical signal generator 124 to become the dummy optical signal. The optical multiplexer 114 multiplexes the optical sign from the delay unit 112 and the dummy optical signal from the optical signal generator 124 together, and then produces a multiplexed optical signal. FIG. 2c shows the waveform of the multiplexed optical signal.

The optical amplifier 116 amplifies the multiplexed optical signal. At this time, as shown in FIG. 2c, the multiplexed optical signals always at $\alpha/2$ in level during the no-data periods during which transmission data does not exist, and also at $\alpha/2$ in average during the data periods during which transmission data exists. Therefore, the optical signal provided to the optical amplifier 116 is approximately constant in optical power, and is not degraded in waveform when amplified.

Figure 2D:
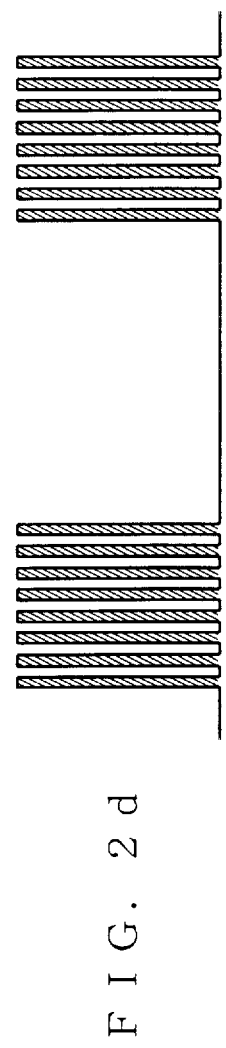

The optical filter 118 has such a transmittance characteristic as shown in FIG. 3a to separate the optical signal of the wave length λ1 from the amplified optical signal having a spectrum shown in FIG. 3b. FIG. 2d shows the waveform of the passed optical signal.

Figure 19:
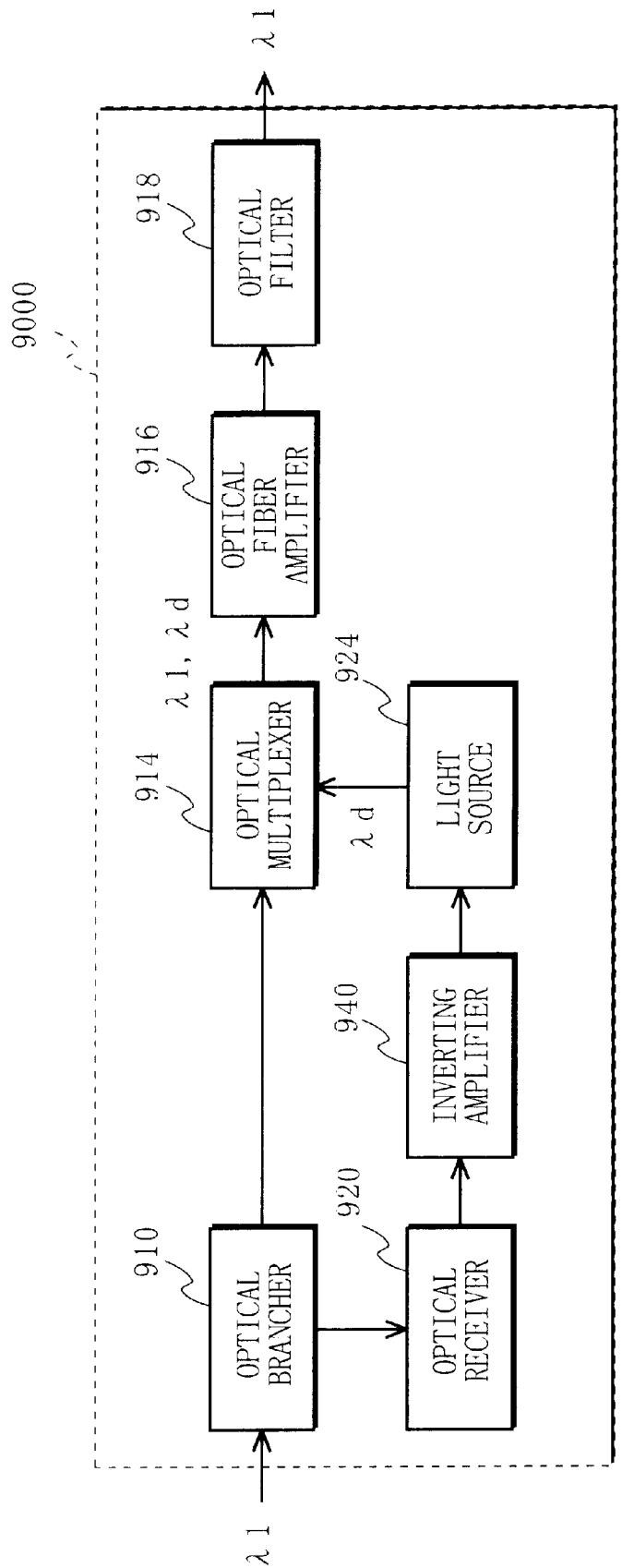
FIG. 19 is a block diagram showing the structure of a conventional optical amplifying device 9000.

As described above, in the first embodiment, the optical signal having the wavelength λ1 and the amplitude α to be amplified is multiplexed with the dummy optical signal having the wavelength λd (≠λ1) and the amplitude α/2 obtained by inverting envelope of the input optical signal. Thus, optical amplification can be carried out without waveform degradation. Furthermore the average optical power of the optical signal provided to the optical amplifier 116 is cut in half, compared with that n the conventional device as shown in FIG. 19. Therefore, higher amplification gain can be achieved. Still further, the control electrical signal outputted from the first controller 22 is generated based on the envelope of the input optical signal. Thus, the present optical amplifying device is less electrically loaded than the conventional device shown in FIG. 19.

In the present embodiment, the dummy optical signal is one-half in amplitude of the input optical signal, but is not necessarily restricted to the above. For making the optical power to the optical amplifier 116 more constant, however, one-half the amplitude of the input optical signal is preferable, as in the present embodiment.

Furthermore, in the present embodiment, the input optical signal is a burst optical signal. Alternatively, an arbitrary optical signal can be amplified.

Still further, in the present embodiment, the input optical signal has a single wavelength, that is, only the wavelength λ1. Similarly, if optical signals with different wavelength λ1 to λn are provided in a time-division manner, for example, these optical signals can be amplified without degradation in waveform. In this case, however, the wavelength λof the dummy optical signal has to be different from any of the wavelengths λ1 to λn.

Still further, in the present embodiment, the optical filter 118 is used for the purpose of separating the optical signal of the wavelength λ1 from the amplified optical signal. Alternatively, an optical router may be used to achieve the same purpose.

Figure 4:
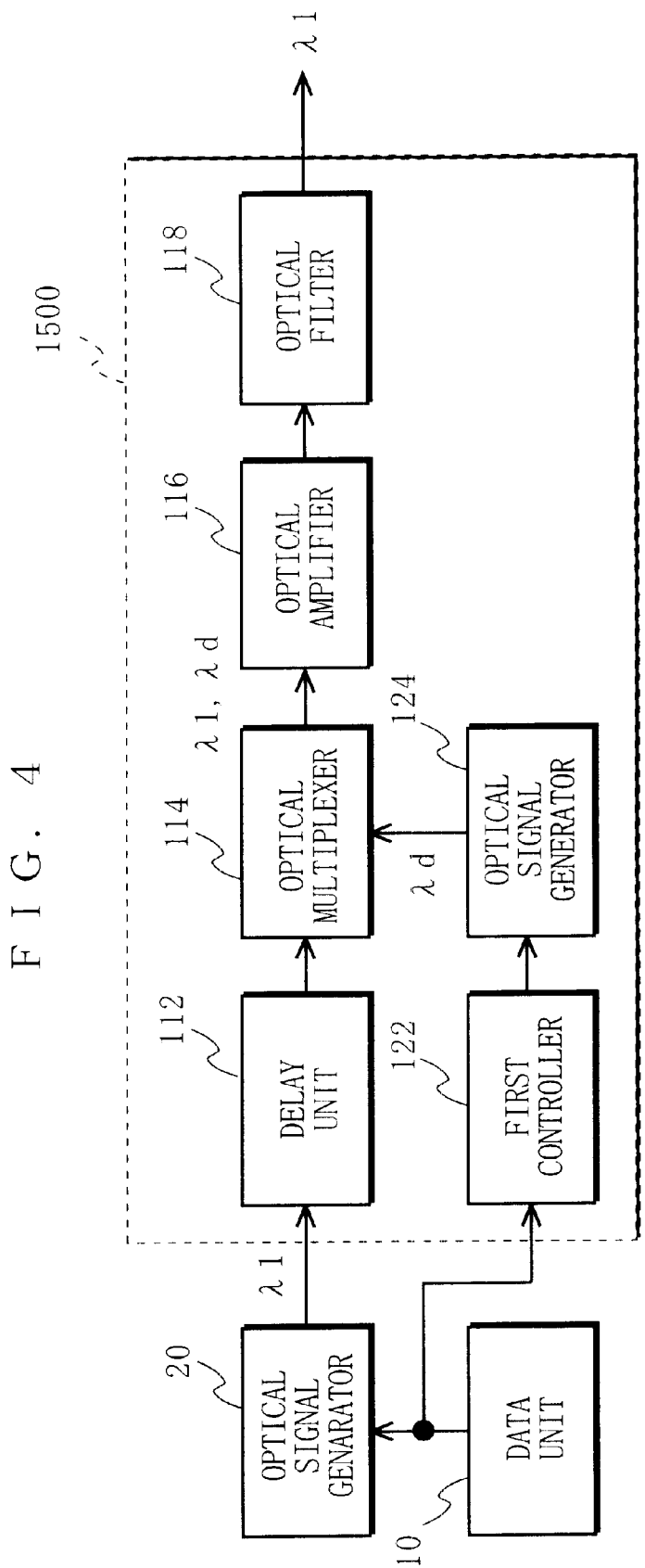
FIG. 4 is a block diagram showing the structure of a system using an optical amplifying device 1500, which is one modification of the optical amplifying device 1000.

In the present embodiment, the input optical signal is converted by the optical detector 120 into an electrical signal, and the control electrical signal is generated by the first controller 122 based on this electrical signal. Alternatively, for example, the control electrical signal may be generated based on an electrical signal to be carried on the input optical signal. Such modification example of the present embodiment is briefly described with reference to FIG. 4. In FIG. 4, components identical in structure to those in FIG. 1 are provided with the same reference numerals.

In FIG. 4, a data unit 10 produces an electrical signal carrying burst-like binary digital data. This electrical signal is converted by an optical signal generator 20 into an optical signal having a wavelength λ1. The optical signal is provided to an optical amplifying device 1500 as the input optical signal.

The electrical signal from the data unit 10 is also provided to the first controller 122 in the optical amplifying device 1500. As in the optical amplifying device 1000 shown in FIG. 1, the first controller 122 provides the optical signal generator 124 with a control electrical signal having a waveform obtained by inverting the waveform of the electrical signal.

The optical signal generator 124 generates a dummy optical signal based on the control electrical signal. The optical multiplexer 124 multiplexes the input optical signal coming through the delay unit 112 and the dummy optical signal together. Thereafter, the operation n of the optical amplifying device 1500 is the same as that of the optical amplifying device 1000 shown in FIG. 1, and therefore not described herein. As such, in the optical amplifying device 1500 according to this modification example, the same effects can be achieved as those in the optical amplifying device 1000 shown in FIG. 1.

Second Embodiment

Figure 5:
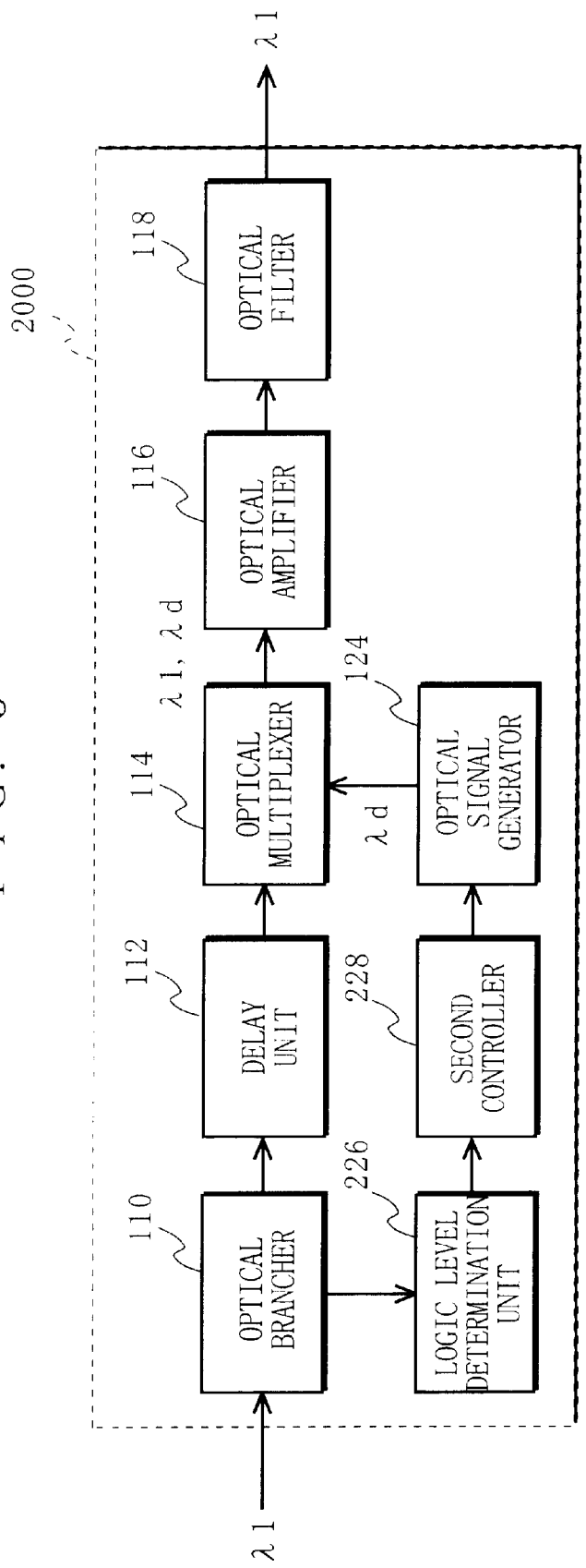
FIG. 5 is a block diagram showing the structure of an optical amplifying vice 2000 according to a second embodiment of the present invention.

FIG. 5 is a block diagram showing the structure of an optical amplifying device according to a second embodiment of the present invention. An optical amplifying device 2000 includes the optical brancher 110, the delay unit 112, the optical multiplexer 114, the optical amplifier 116, the optical filter 118, a logic level determination unit 226, a second controller 228, and the optical signal generator 124. Note that, in FIG. 5, components identical in structure to those in FIG. 1 are provided with the same reference numerals. With reference to FIGS. 5 and 6a to 6d, the operation n of the optical amplifying device according to the second embodiment is described below.

Figure 6:
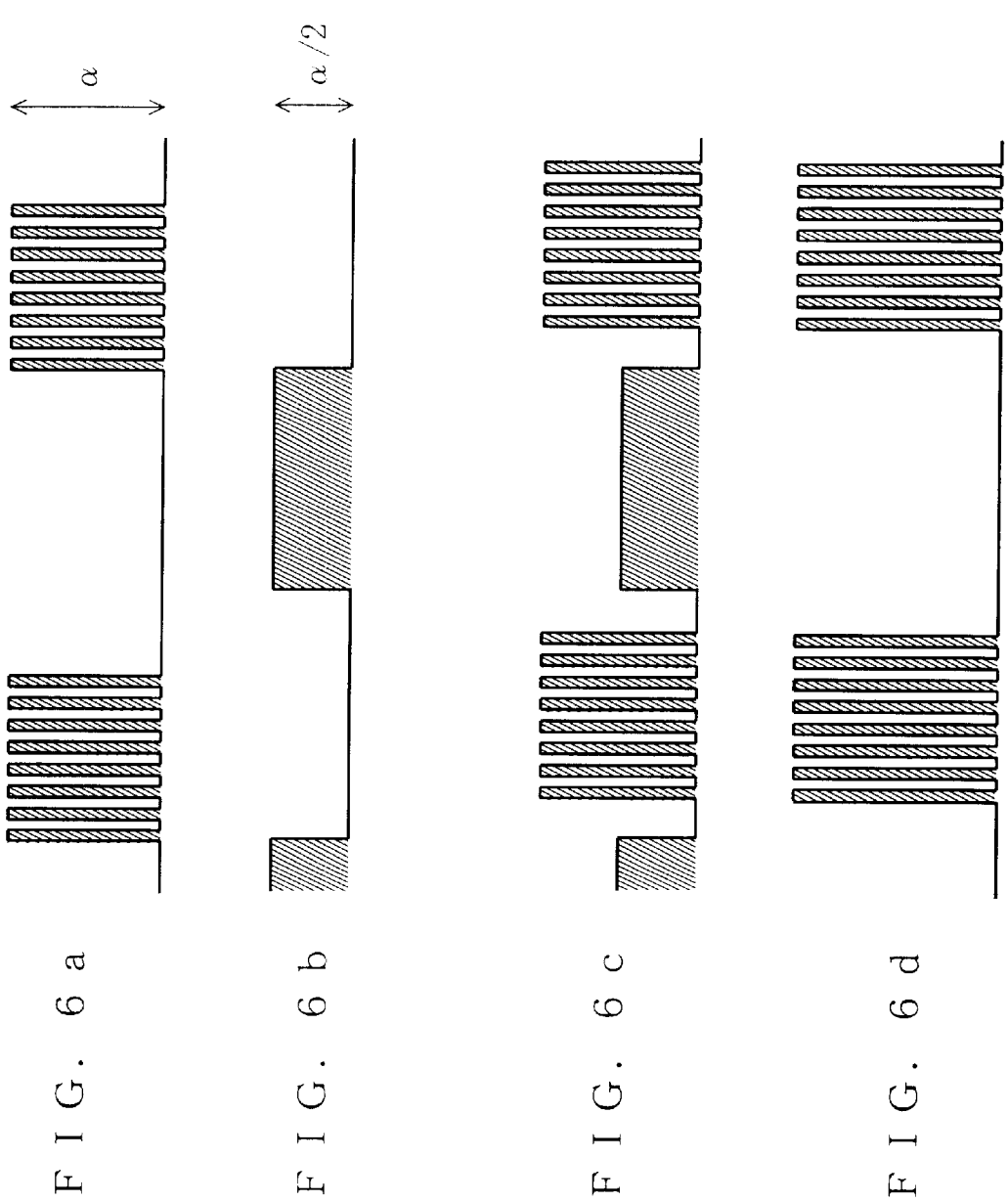
FIGS. 6a to 6d are diagrams showing waveforms of optical signals in the optical amplifying device 2000.

The optical amplifying device 2000 is provided with an input optical signal having a waveform λ1 and an amplitude α. This optical signal carries burst-like binary digital data. FIG. 6a shows the waveform of this optical signal. In FIG. 6a, a period during which binary digital data is carried on the optical signal is referred to as a data period, while a period during which no binary digital data is carried thereon is referred to as a no-data period.

The optical brancher 110 branches the received optical signal into two. The logic level determination unit 226 determines the level of the binary digital data carried on one optical signal outputted from the optical brancher 110. The second controller 228 generates a control electrical signal based on a determination made by the logic level determination unit 226. This control electrical signal becomes α/2 in level from 0, for example, when the logic level determination unit 226 determines that the value of the digital data continuously indicates 0 for more than a predetermined time A1, and returns to "0" when the value of the digital data becomes 1. The time A1 is predetermined based on physical characteristics of the optical amplifier 116, such as a relaxation time constant, and other factors. Based on this control electrical signal, the optical signal generator 124 produces a dummy optical signal having the wavelength λd and the amplitude α/2. FIG. 6b shows the waveform of this dummy optical signal.

On the other hand, the other optical signal outputted from the optical brancher 110 is delayed by the delay unit 112 for a predetermined time, and then forwarded to the optical multiplexer 114. Here, the predetermined time is a time required for the one optical signal outputted from the optical brancher 110 to go through the logic level determination unit 226, the second controller 228, and then the optical signal generator 124 to become the dummy optical signal. The optical multiplexer 114 multiplexes the optical signal from the delay unit 112 and the dummy optical signal from the optical signal generator 124 together, and then produces a multiplexed optical signal. FIG. 6c shows the waveform of the multiplexed optical signal.

The effects of optical surges that occur when the input optical signal is changed in level from 0 to α become larger as the period at the level 0 before the change is longer. Therefore, if the no-data period continues for more than the predetermined time A1, the input optical signal is multiplexed with the dummy optical signal so that the no-data period of the multiplexed optical signal provided to the optical amplifier 116 does not continue for more than the time A1. Thus, the effects of optical surges at amplification can be suppressed within a permissible range.

The optical amplifier 116 amplifies the multiplexed optical signal. At this time, as shown in FIG. 6c, a period during which the multiplexed optical signal is at the "0" level is, at most, the time A1.

After amplification, similarly to the first embodiment, the optical filter 118 separates the optical signal having the wavelength λ1 from the amplified optical signal. FIG. 6d shows the waveform of the separated optical signal.

As described above, according to the second embodiment, the no-data period of the multiplexed optical signal provided to the optical amplifier 116 is controlled so as to become, at most, the time A1. Thus, the effects of optical surges at amplification can be suppressed within a permissible range. Moreover, the average optical power of the optical signal provided to the optical amplifier 116 is smaller than that in the conventional device shown in FIG. 19. Thus, more amplification gain can be obtained.

Third Embodiment

Figure 7:
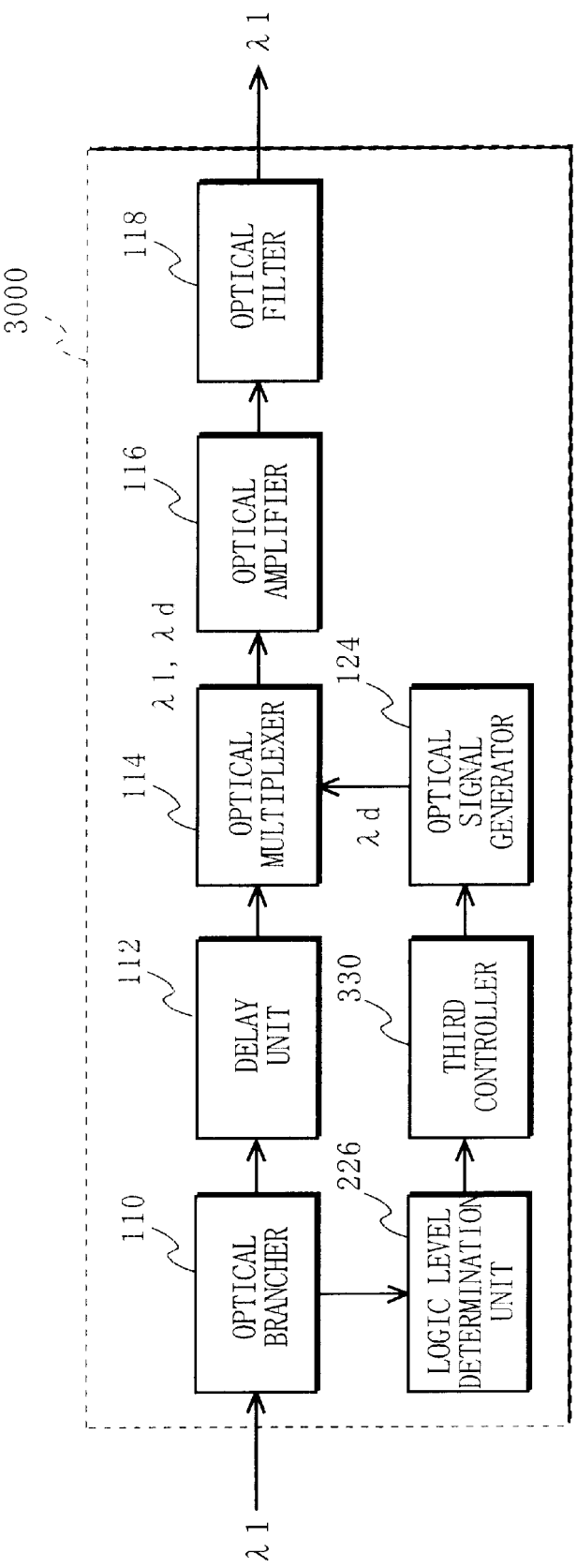
FIG. 7 is a block diagram showing the structure of an optical amplifying device 3000 according to a third embodiment of the present invention.

FIG. 7 is a block diagram showing the structure of an optical amplifying device according to a third embodiment of the present invention. An optical amplifying device 3000 includes the optical brancher 110, the delay unit 112, the optical multiplexer 114, the optical amplifier 116, the optical filter 118, the logic level determination unit 226, a third controller 330, and the optical signal generator 124. Note that, in FIG. 7, components identical in structure to those shown in FIG. 5 are provided with the same reference numerals. With reference to FIGS. 7 and 8a to 8d, the operation n of the optical amplifying device according to the third embodiment is described below.

Figure 8:
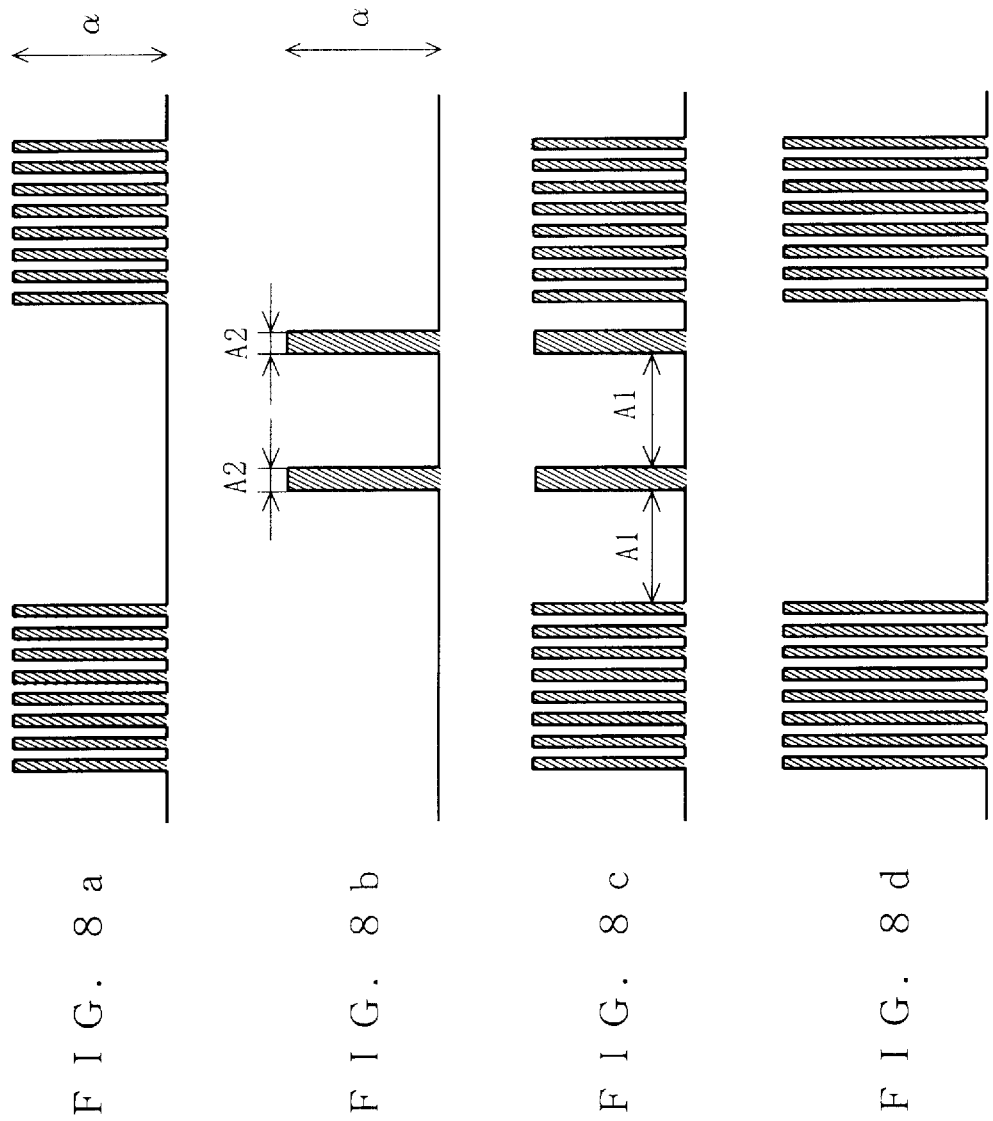
FIGS. 8a to 8d are diagrams showing waveforms of optical signals in the optical amplifying device 3000.

The optical amplifying device 3000 is provided with an input optical signal having a waveform λ1 and an amplitude α. This optical signal carries burst-like binary digital data. FIG. 8a shows the waveform of this optical signal.

The optical brancher 110 branches the received optical signal in two. The logic level determination unit 226 determines the level of the binary digital data carried on one optical signal outputted from the optical brancher 110. The third controller 330 generates a control electrical signal based on a determination made by the logic level determination unit 226. The generated control electrical signal has pulses with the amplitude α and a width A2, for example. Every time when the logic level determination unit 226 determines that the value of the data continuously indicates "0" for more than the predetermined time A1, the pulse is outputted. The time A1 is predetermined based on a relaxation time constant of the optical amplifier 116 and other factors. Based on this control electrical signal, the optical signal generator 124 produces a dummy optical signal having the wavelength λd. FIG. 8b shows the waveform of this dummy optical signal.

On the other hand, the other optical signal outputted from the optical brancher 110 is delayed by the delay unit 112 for a predetermined time, and then forwarded to the optical multiplexer 114. Here, the predetermined time is a time required for the one optical signal outputted from the optical brancher 110 to go through the logic level determination unit 226, the third controller 330, and then the optical signal generator 124 to become the dummy optical signal. The optical multiplexer 114 multiplexes the optical signal from the delay unit 112 and the dummy optical signal from the optical signal generator 124 together, and then produces a multiplexed optical signal. FIG. 8c shows the waveform of the multiplexed optical signal.

The effects of optical surges that occur when the input optical signal is changed in level from 0 to α become larger as the period at the level 0 before the change is longer. Therefore, if the no-data period continues for more than the predetermined time A1, the input optical signal is multiplexed with the dummy optical signal so that the no-data period of the multiplexed optical signal provided to the optical amplifier 116 does not continue for more than the time A1. Thus, the effects of optical surges at amplification can be suppressed within a permissible range.

The optical amplifier 116 amplifies the multiplexed optical signal. At this time, as shown in FIG. 8c, a period during which the multiplexed optical signal is at the "0" level is, at most, the time A1

After amplification, similarly to the first embodiment, the optical filter 118 separates the optical signal of the wavelength λ1 from the amplified optical signal. FIG. 8d shows the waveform of the separated optical signal.

In the present embodiment, the pulse width A2 is fixed, but may be variable if, for example, the pulses of the dummy optical signal overlap with the data period of the input optical signal. In such case, pulses are changed to be shorter in width for preventing the overlapping.

As described above, according to the third embodiment, the no-data period of the multiplexed optical signal provided to the optical amplifier 116 is controlled so as to become the time A1 at most. Thus, the effects of optical surges at amplification can be suppressed within a permissible range. Moreover, the average optical power of the optical signal provided to the optical amplifier 116 is significantly smaller than that in the conventional device shown in FIG. 19. Thus, more amplification gain can be obtained.

Note that, in the second and third embodiments, the input optical signal is a burst optical signal. Alternatively, similarly to the case in the first embodiment, an arbitrary optical signal can be amplified.

Furthermore, in the second and third embodiments, the input optical signal has a single wavelength, that is, only the wavelength λ1. Similarly, if optical signals with different wavelengths λ1 to λ1 are provided in a time-division manner, for example, these optical signals can be amplified without degradation in waveform. In this case, however, the wavelength λd of the dummy optical signal has to be different from any of the wavelengths λ1 to λn.

Still further, in the second and third embodiments, the optical filter 118 is used for the purpose of separating the optical signal of the wavelength λ1 from the amplified optical signal. Alternatively, an optical router may be used to achieve the same purpose.

Still further, in the second and third embodiments, based on the determination made by the logic level determination unit 226, the second and third controller 228 and 330 generate the control electrical signal. Alternatively, for example, the control electrical signal may be generated based on an electrical signal to be carried on the input optical signal.

Fourth Embodiment

Figure 9:
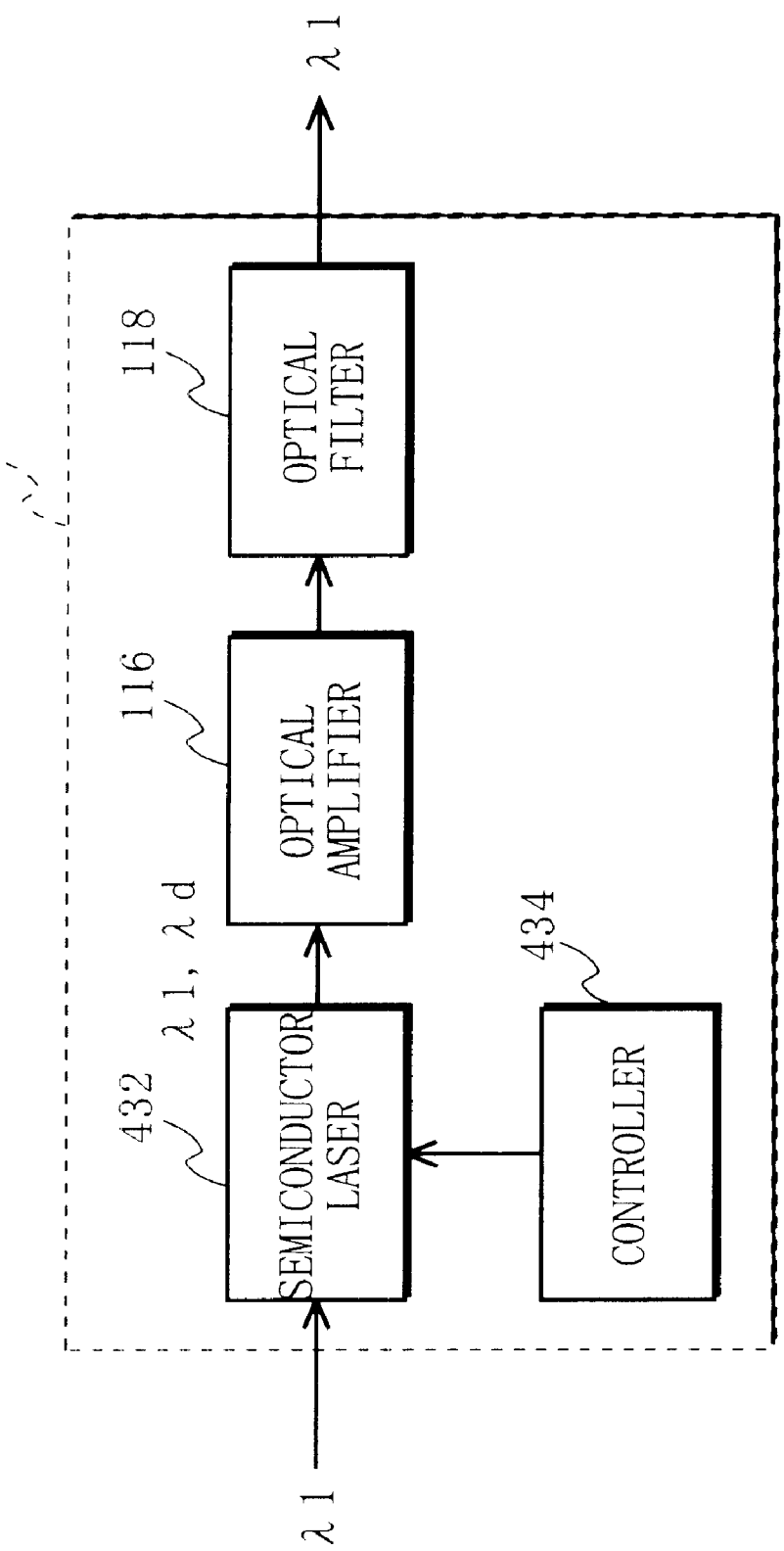
FIG. 9 is a block diagram showing the structure of an optical amplifying device 4000 according to a fourth embodiment of the present invention.
Figures 10A, 10B:
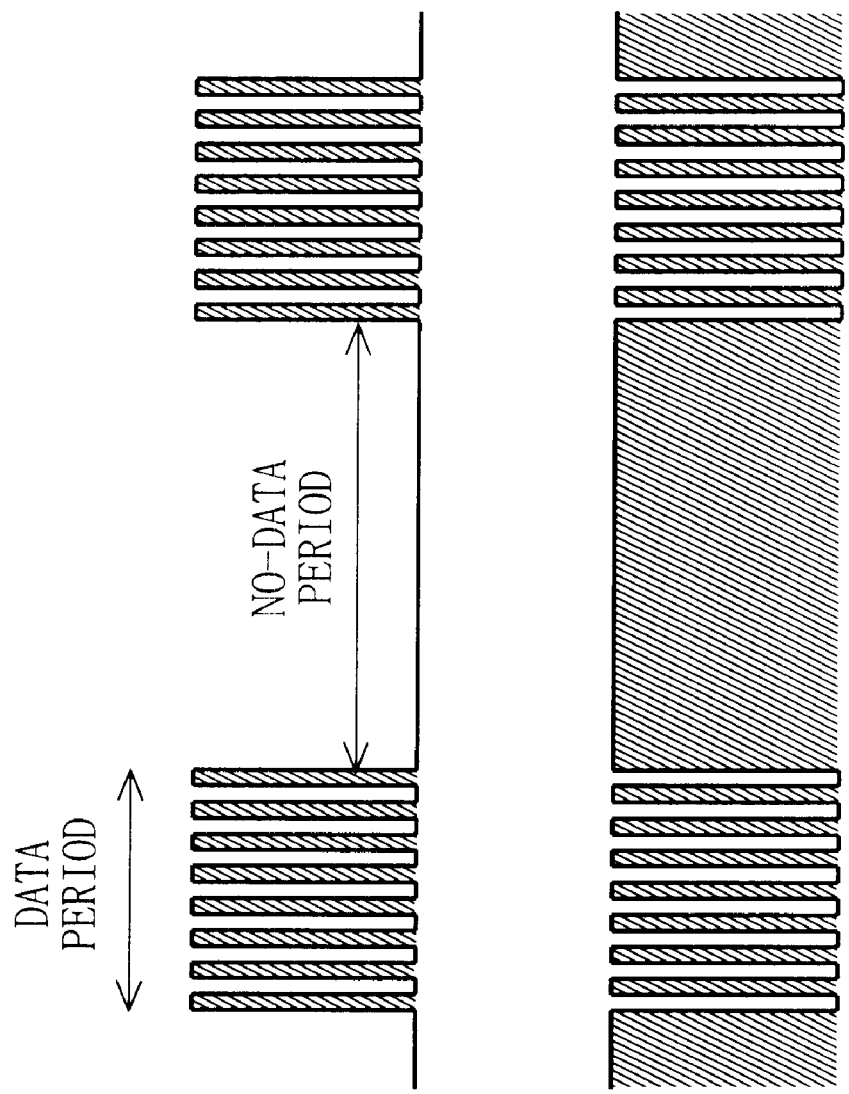
FIGS. 10a and 10b are diagrams showing waveforms of optical signals in the optical amplifying device 4000.

FIG. 9 is a block diagram showing the structure of an optical amplifying device according to a fourth embodiment of the present invention. An optical amplifying device 4000 includes a semiconductor laser 432, a controller 434, the optical amplifier 116, and the optical filter 118. Note that, in FIG. 9, components identical in structure to those shown in FIG. 1 are provided with the same reference numerals. With reference to FIGS. 9, 10a, and 10b, the operation n of the optical amplifying device according to the present embodiment is now described.

The optical amplifying device 4000 is provided with an input optical signal having a wave form $\lambda 1$. This optical signal carries burst-like binary digital data. FIG. 10a shows the waveform of this optical signal.

The semiconductor laser 432 is controlled by the controller 434 so as to produce an optical signal having a wavelength $\lambda d$ and identical in amplitude of the received optical signal having the wavelength $\lambda 1$. The semiconductor laser 432 is implemented as a distributed Bragg reflector (DBR) type semiconductor laser, for example. Such a semiconductor laser has characteristics of, when an optical signal having a wavelength different from that of the semiconductor laser is externally provided thereto, suppressing oscillation thereof and transmitting this externally-provided optical signal.

In other words, while the input light with wavelength $\lambda 1$ to the semiconductor laser 432 is 0 in optical power, that is, while the optical power is 0 during both of the data and no-data periods shown in FIG. 10a, the semiconductor laser 432 produces an optical signal of predetermined power having a wavelength $\lambda d$ under the control of the controller 434. On the other hand, while the input light to the semiconductor laser 432 is not 0 in optical power, the semiconductor laser 432 is suppressed in oscillation in response to the optical power. Therefore, the waveform of the optical signal having the wavelength $\lambda d$ outputted from the semiconductor laser 432 becomes the inverted one of the input light, as shown in FIG. 10b. This optical signal of the wavelength $\lambda d$ corresponds to the dummy optical signal in the above-described conventional device and optical amplifying device according to the first embodiment.

From the semiconductor laser 432, the light of the wavelength $\lambda 1$ transmitted there through and the above-stated dummy optical signal of the wavelength $\lambda d$ are both outputted. As stated above, the light and the dummy optical signal are inverted in waveform to each other. Therefore, the light outputted from the semiconductor laser 432 is constant in optical power.

The light outputted from the semiconductor laser 432 is amplified by the optical amplifier 116. At this time, the light provided to the optical amplifier 116 is approximately constant in optical power, and therefore optical surges do not occur. After amplification, the optical filter 118 passes the optical signal of the wavelength $\lambda 1$.

As described above, in the fourth embodiment, the optical signal of the wavelength $\lambda 1$ to be amplified is provided to the semiconductor laser 432 oscillating with the wavelength $\lambda d$ that is different from the wavelength $\lambda 1$. Thus, an optical signal constant in optical power and composed of the input optical signal superposed with the dummy signal is produced. Therefore, the optical amplifying device capable of carrying out optical amplification without degradation in waveform can be achieved in a more simplified structure, compared with the above-described conventional device and the optical amplification device according to the first embodiment.

In the present embodiment, the input optical signal is a burst optical signal. Alternatively, an arbitrary optical signal can be amplified.

Furthermore, in the present embodiment, the input optical signal has a single wavelength, that is, only the wavelength $\lambda 1$. Similarly, if optical signals with different wavelengths $\lambda 1$ to $\lambda n$ are provided in a time-division manner, for example, these optical signals can be amplified without degradation in waveform. In this case, however, the wavelength $\lambda d$ of the dummy optical signal has to be different from any of the wavelengths $\lambda 1$ to $\lambda n$.

Still further, in the present embodiment, the optical filter 118 is used for the purpose of separating the optical signal of the wavelength $\lambda 1$ from the amplified optical signal. Alternatively, an optical router may be used to achieve the same purpose. If the optical router is used, the dummy optical signal may be used for data transmission or feedback control. Described below are modification examples according to the present embodiment, as fifth and sixth embodiments.

Fifth Embodiment

FIG. 11 is a block diagram showing the structure of an optical amplifying device according to the fifth embodiment of the present invention. An optical amplification device 5000 includes the semiconductor laser 432, the controller 434, the optical amplifier 116, and a first optical router 536. Note that, in FIG. 11, components identical in structure to those in FIG. 9 are provided with the same reference numerals. With reference to FIGS. 11 and 12a to 12c, the operation n of the optical amplifying device according to the present embodiment is now described. Note that the fifth embodiment is different from the fourth only in that the first optical router 536 is provided instead of the optical filter 118. Therefore, the other components are not described in detail herein.

Figure 12A:
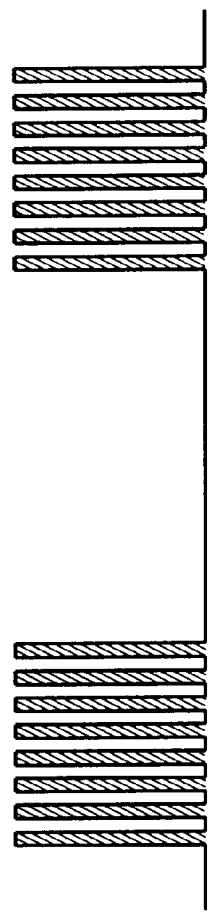
FIGS. 12a to 12c are diagrams showing waveforms of optical signals in the optical amplifying device 5000.

The optical amplifying device 5000 is provided with an input optical signal having a waveform $\lambda 1$. FIG. 12a shows the waveform of this optical signal. Similarly to the fourth embodiment, the optical signal transmitted through the semiconductor that oscillates with a wavelength $\lambda d$ is multiplexed with a dummy optical signal of the wavelength $\lambda d$, and then amplified by the optical amplifier 116.

Figure 12B:

The amplified optical signal is provided to the first optical filter 536. The first optical filter 536 has first and second output ports each having transmittance characteristics as shown in FIG. 13a. Out of the amplified optical signal having a spectrum shown in FIG. 13b, the first optical router 536 outputs the optical signal of the e wavelength $\lambda 1$ from the first output port and the dummy optical signal of the wavelength $\lambda d$ from the second output port. FIG. 12b shows the waveform of the optical signal outputted from the first output port, while FIG. 12c shows that of the optical signal outputted from the second output port.

Figure 12C:
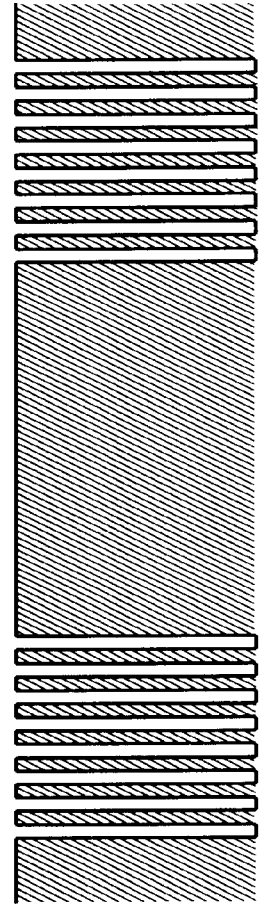

As evident from FIGS. 12b and 12c, the optical signals outputted from the first and second output ports are inverted in waveform, but these signals carry the same information. Therefore, by transmitting both of the optical signals, the information identical to that carried on the input optical signal can be transmitted.

As such, in the fifth embodiment, not only the optical signal of the wavelength $\lambda 1$ to be amplified but also the dummy optical signal of the wavelength $\lambda d$ is used for data transmission. Thus, the gene rated optical signals can be utilized more effectively.

In the present embodiment, the input optical signal is a burst optical signal. Alternatively, an arbitrary optical signal can be amplified.

Furthermore, in the present embodiment, the input optical signal has a single wavelength, that is, only the wavelength $\lambda 1$. Similarly, if optical signals with different wavelengths $\lambda 1$ to $\lambda n$ are provided in a time-division manner, for example, these optical signals can be amplified without degradation in waveform. In this case, however, the wavelength $\lambda d$ of the dummy optical signal has to be different from any of the wavelengths $\lambda 1$ to $\lambda n$.

In the present embodiment, the first optical router 536 has two outputports. Alternatively, the first optical router 536 may have three or more output ports for outputting lights of the wavelengths $\lambda 1$ to $\lambda n$ and $\lambda d$.

To get around the above problem, if the distance L1 is longer than the distance L2, the controller 434 controls the dummy optical signal of the wavelength $\lambda d$ outputted from the semiconductor laser 432 to be smaller in amplitude than the optical signal of the wavelength $\lambda 1$ to be amplified. Thus, the same transmission characteristics can be observed in these optical signals and, by extension, in the system as a whole.

Sixth Embodiment

FIG. 15 is a block diagram showing the structure of an optical amplifying device according to the sixth embodiment of the present invention. An optical amplifying device 6000 includes the semiconductor laser 432, the controller 434, the optical amplifier 116, and the first optical router 536. Note that, in FIG. 15, components identical in structure to those shown in FIG. 11 are provided with the same reference numerals. With reference to FIG. 15, the operation n of the optical amplifying device according to the present embodiment is now described. The optical amplifying device according to the sixth embodiment is different from that according to the fifth only in that the optical signal of the wavelength $\lambda d$ outputted from the first optical router 536 is used not for transmission but for control of the output light from the semiconductor laser 432. Therefore, the other components are not described in detail herein.

The optical signal of the wavelength $\lambda d$ outputted from the first optical router 536 in a manner similar to that in the fifth embodiment is provided to the controller 434. The controller 434 monitors this optical signal to control the semiconductor laser 432 so that the oscillation wavelength thereof becomes the wavelength $\lambda d$ and that the dummy optical signal from the semiconductor laser 432 becomes equal in amplitude to the optical signal of the wavelength $\lambda 1$ to be amplified.

In general, semiconductor lasers are feedback-controlled based on light output therefrom. However, in the present embodiment, the output light from the semiconductor laser 432 includes the light of the wavelength $\lambda 1$ and the dummy optical signal of the wavelength $\lambda d$, and therefore cannot be referred to for feedback control. For this reason, in the present embodiment, the first optical router 536 separates the controller 434 with the optical signal of the wavelength $\lambda d$ from the amplified optical signal for feedback control.

As described above, according to the present embodiment, the optical signal of the wavelength $\lambda d$ outputted from the first optical router 536 is monitored. Thus, in addition to the effects similar to those in the fourth embodiment, the optical amplifying device according to the fifth embodiment has an effect such that the output light from the semiconductor laser 432 can be controlled more accurately.

Figure 16:
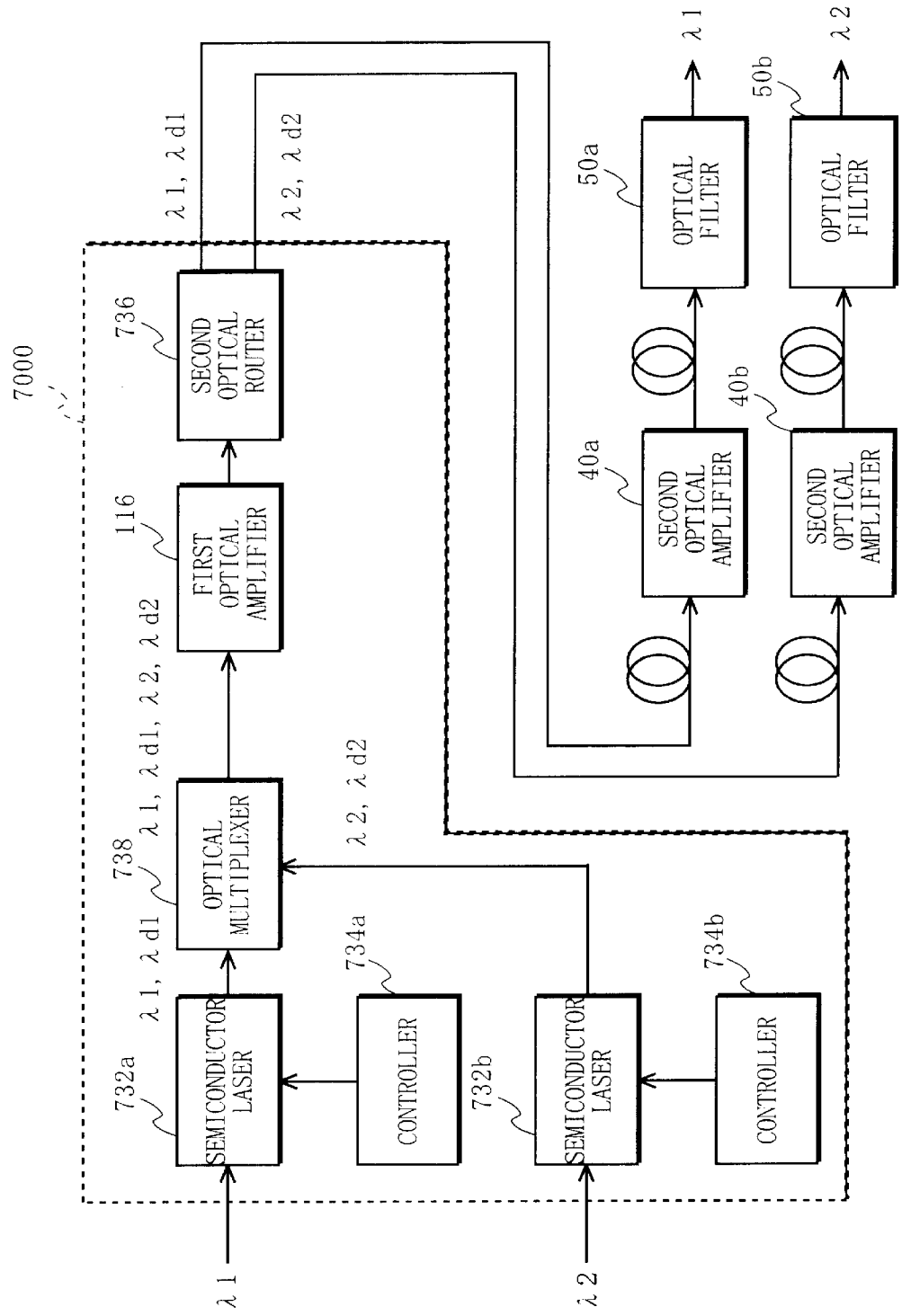
FIG. 16 is a block diagram showing the structure of an optical transmission system according to a seventh embodiment of the present invention.
Figure 18B:
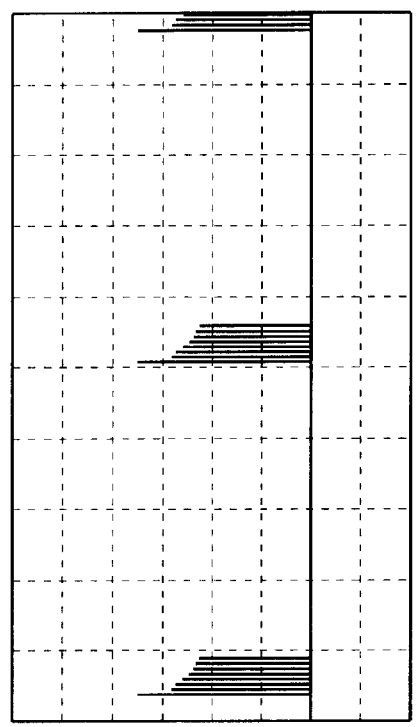
FIGS. 18a and 18b are diagrams in assistance of explaining optical surges that occur when a burst optical signal is amplified.
Figure 18A:
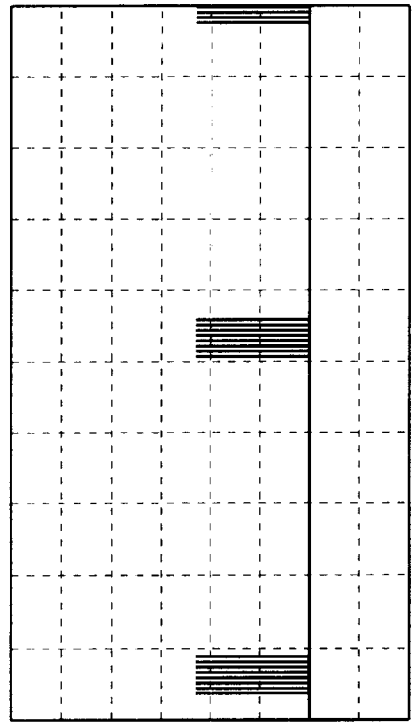

With reference to FIGS. 16, 17a, and 17b, described is a system in which an optical signal is amplified by an optical amplifying device and then again amplified for long-distance transmission Seventh Embodiment FIG. 16 is a block diagram showing the structure of an optical transmission system according to a seventh embodiment of the present invention. The optical transmission system includes an optical amplifying device 7000, second optical amplifiers 40a and 40b, and optical filters 50a and 50b. The optical amplifying device 7000 includes semiconductor lasers 732a and 732b, controllers 734a and 734b, an optical multiplexer 738, the first optical amplifier 116, and a second optical router 736. Note that the first optical amplifier 116 shown in FIG. 16 is identical in structure to the optical amplifier 116 shown in FIG. 11. The operation n of the present optical transmission system is now described below.

The optical amplifying device 7000 is provided with two optical signals having different wavelengths, one with a wavelength $\lambda 1$ and the other with a wavelength $\lambda 2$. The optical signal of the wavelength $\lambda 1$ is provided to the semiconductor laser 732a, which is controlled by the controller 734a, and then multiplexed with a dummy optical signal of a wavelength $\lambda d1$. On the other hand, the optical signal of the wavelength $\lambda 2$ is provided to the semiconductor laser 732b, which is controlled by the controller 734b, and then multiplexed with a dummy optical signal of a wavelength of $\lambda/d2$.

Output lights from the semiconductor lasers 732a and 732b are multiplexed with each other by the optical multiplexer 738, and then amplified by the first optical amplifier 116. At this time, the output lights from the semiconductor lasers 732a and 732b are constant in optical power and, accordingly, an output light from the optical multiplexer 738 is also constant in optical power. Therefore, optical surges at optical amplification do not occur in the first optical amplifier 116.

The amplified optical signal is provided to the second optical router 736. The second optical router 736 has first and second output ports, and is structured as an AWG (Arrayed Wave Guide) having cyclic transmittance characteristics as shown in FIG. 17a. Of the input optical signal having a spectrum shown in FIG. 17b, the second optical router 736 outputs, from the first output port, the optical signal of the wavelength $\lambda 1$ to be amplified and the dummy optical signal of the wavelength $\lambda d$ 1 and, from the second output port, the optical signal of the wavelength $\lambda 2$ to be amplified and the dummy optical signal of the wavelength $\lambda d2$.

The optical signal outputted from the first output port is again amplified by the second optical amplifier 40a in the course of transmission through an optical fiber. The optical signal inputted to the second optical amplifier 40a is constant in optical power, like the output light from the semiconductor laser 732a. Therefore, optical surges at optical amplification do not occur in the second optical amplifier 40a. The amplified optical signal is provided to the optical filter 50a that passes the optical signal of the wavelength $\lambda 1$.

Similarly, the optical signal outputted from the second output port is again amplified by the second optical amplifier 40b, and then provided to the optical filter 50b that passes the optical signal of the wavelength $\lambda 2$.

As described above, according to the present embodiment, when the amplified optical signal is transmitted through a router, the input optical signal and the dummy optical signal are both outputted from the same port for transmission. Therefore, optical surges do not occur when the optical signal from the router is again amplified by another optical amplifier. Thus, amplification can be carried out twice or more without further requiring such device as the optical amplifying device 4000 shown in FIG. 9 for suppressing optical surges. Consequently, the system can be simplified in structure.

While the invention has been described in detail, the foregoing description is in all aspects illustrative and not restrictive. It is understood that numerous other modifications and variations can be devised without departing from the scope of the invention.

What is claimed is:

1. An optical amplifying device for amplifying an input optical signal, said optical amplifying device comprising:
    a control electrical signal generating means for generating a control electrical signal having a waveform obtained by inverting an envelope of the input optical signal;
    a light-emitting means for outputting, based on the control electrical signal, a dummy optical signal having a wavelength that is different from a wavelength of the input optical signal;
    a multiplex means for multiplexing the input optical signal and the dummy optical signal to generate a multiplexed optical signal;
    an amplifying means for amplifying the multiplexed optical signal generated by said multiplex means and outputting an amplified optical signal; and
    a separating means for separating at least the input optical signal from the amplified optical signal outputted by said amplifying means.

2. The optical amplifying device according to claim 1, further comprising:
    a branching means for branching the input optical signal into a first branched optical signal and a second branched optical signal; and
    a light receiving means for converting the first branched optical signal into an electrical signal;
    wherein said control electrical signal generating means generates the control electrical signal based on the electrical signal from said light receiving means; and
    wherein said multiplex means multiplexes the second branched optical signal branched by said branching means and the dummy optical signal.

3. The optical amplifying device according to claim 1, wherein said control electrical signal generating means is provided with an electrical signal, the electrical signal is converted into the input optical signal, and said control electrical signal generating means generates the control electrical signal based on the provided electrical signal.

4. The optical amplifying device according to claim 2, further comprising a delay means for delaying the second branched optical signal for a predetermined time.

5. The optical amplifying device according to claim 3, further comprising a delay means for delaying, before input to said multiplex means, the input optical signal for a predetermined time.

6. The optical amplifying device according to claim 1, wherein said amplifying means is an optical fiber amplifier.

7. The optical amplifying device according to claim 1, wherein the input optical signal is a burst optical signal.

8. An optical amplifying method for amplifying an input optical signal, said method comprising:
    generating a control electrical signal having a waveform obtained by inverting an envelope of the input optical signal;
    outputting, based on the control electrical signal, a dummy optical signal having a wavelength that is different from a wavelength of the input optical signal;
    multiplexing the input optical signal and the dummy optical signal to generate a multiplexed optical signal;
    amplifying the multiplexed optical signal generated by said multiplexing and outputting an amplified optical signal; and
    separating at least the input optical signal from the amplified optical signal outputted by said amplifying.

9. The optical amplifying device according to claim 1, wherein a period during which binary digital data is carried on the input optical signal is referred to as a data period and a period during which no binary digital data is carried on the input optical signal is referred to as a no-data period, and wherein the envelope of the input optical signal is defined by the data period and the no-data period.

10. The optical amplifying method according to claim 8, wherein a period during which binary digital data is carried on the input optical signal is referred to as a data period and a period during which no binary digital data is carried on the input optical signal is referred to as a no-data period, and wherein the envelope of the input optical signal is defined by the data period and the no-data period.

11. An optical amplifying device for amplifying an input optical signal, said optical amplifying device comprising:
    a control electrical signal generating means for generating a control electrical signal having a waveform obtained by inverting an envelope of the input optical signal;
    a light-emitting means for outputting, based on the control electrical signal, a dummy optical signal having a wavelength that is one-half in amplitude of a wavelength of the input optical signal;
    a multiplex means for multiplexing the input optical signal and the dummy optical signal to generate a multiplexed optical signal;
    an amplifying means for amplifying the multiplexed optical signal generated by said multiplex means and outputting an amplified optical signal; and
    a separating means for separating at least the input optical signal from the amplified optical signal outputted by said amplifying means.

12. An optical amplifying device for amplifying an input optical signal, said optical amplifying device comprising:
    a control electrical signal generating device operable to generate a control electrical signal having a waveform obtained by inverting an envelope of the input optical signal;
    a light-emitting device operable to output, based on the control electrical signal, a dummy optical signal having a wavelength that is one-half in amplitude of a wavelength of the input optical signal;
    a multiplex device operable to multiplex the input optical signal and the dummy optical signal to generate a multiplexed optical signal;
    an amplifying device operable to amplify the multiplexed optical signal generated by said multiplex device and output an amplified optical signal; and
    a separating device operable to separate at least the input optical signal from the amplified optical signal outputted by said amplifying device.

13. An optical amplifying device for amplifying an input optical signal, said optical amplifying device comprising:
    a control electrical signal generating device operable to generate a control electrical signal having a waveform obtained by inverting an envelope of the input optical signal;
    a light-emitting device operable to output, based on the control electrical signal, a dummy optical signal having a wavelength that is different from a wavelength of the input optical signal;

a multiplex device operable to multiplex the input optical signal and the dummy optical signal to generate a multiplexed optical signal;

an amplifying device operable to amplify the multiplexed optical signal generated by said multiplex device and output an amplified optical signal; and a separating device operable to separate at least the input optical signal from the amplified optical signal outputted by said amplifying device.

14. The optical amplifying device according to claim 13, further comprising:

a branching device operable to branch the input optical signal into a first branched optical signal and a second branched optical signal; and a light receiving device operable to convert the first branched optical signal into an electrical signal;

wherein said control electrical signal generating device is operable to generate the control electrical signal based on the electrical signal from said light receiving device; and wherein said multiplex device is operable to multiplex the second branched optical signal branched by said branching device and the dummy optical signal.

15. The optical amplifying device according to claim 13, wherein said control electrical signal generating device is provided with an electrical signal, the electrical signal is converted into the input optical signal, and said control electrical signal generating device generates the control electrical signal based on the provided electrical signal.

16. The optical amplifying device according to claim 14, further comprising a delay device operable to delay the second branched optical signal for a predetermined time.

17. The optical amplifying device according to claim 15, further comprising a delay device operable to delay, before being input to said multiplex device, the input optical signal for a predetermined time.

18. The optical amplifying device according to claim 13, wherein said amplifying device is an optical fiber amplifier.

19. The optical amplifying device according to claim 13, wherein the input optical signal is a burst optical signal.

20. The optical amplifying device according to claim 13, wherein a period during which binary digital data is carried on the input optical signal is referred to as a data period and a period during which no binary digital data is carried on the input optical signal is referred to as a no-data period, and wherein the envelope of the input optical signal is defined by the data period and the no-data period.

* * * * *